United States Patent
Böhm et al.

(10) Patent No.: US 8,180,135 B2
(45) Date of Patent: May 15, 2012

(54) METHOD FOR PROVIDING VARIOUSLY PROCESSED IMAGE DATA AND X-RAY IMAGE SYSTEM

(75) Inventors: Stefan Böhm, Oberasbach (DE); Klaus Finkler, Spardorf (DE); Bernhard Geiger, Buckenhof (DE)

(73) Assignee: Siemens Aktiengesellschaft, München (DE)

( * ) Notice: Subject to any disclaimer, the term of this patent is extended or adjusted under 35 U.S.C. 154(b) by 552 days.

(21) Appl. No.: 12/310,940

(22) PCT Filed: Sep. 20, 2007

(86) PCT No.: PCT/EP2007/059939
§ 371 (c)(1),
(2), (4) Date: Mar. 12, 2009

(87) PCT Pub. No.: WO2008/034862
PCT Pub. Date: Mar. 27, 2008

(65) Prior Publication Data
US 2009/0257637 A1 Oct. 15, 2009

(30) Foreign Application Priority Data
Sep. 20, 2006 (DE) .......... 10 2006 044 189

(51) Int. Cl.
*G06K 9/36* (2006.01)
(52) U.S. Cl. .................. 382/132; 378/98.12
(58) Field of Classification Search .......... 382/128, 382/130, 131, 132; 378/98.11, 98.12
See application file for complete search history.

(56) References Cited

U.S. PATENT DOCUMENTS

| | | | |
|---|---|---|---|
| 6,263,096 B1 * | 7/2001 | Boag et al. | 382/128 |
| 6,775,346 B2 * | 8/2004 | Heuscher et al. | 378/4 |
| 7,003,147 B2 * | 2/2006 | Inoue | 382/132 |
| 7,266,229 B2 * | 9/2007 | Couwenhoven et al. | 382/132 |
| 7,471,844 B2 | 12/2008 | Tadas | |
| 7,489,799 B2 * | 2/2009 | Nilsen et al. | 382/100 |
| 7,494,276 B2 | 2/2009 | Borgmann et al. | |
| 7,680,307 B2 * | 3/2010 | Sathyanarayana | 382/128 |
| 7,796,835 B2 * | 9/2010 | Matsumoto | 382/276 |
| 7,822,243 B2 * | 10/2010 | Demharter | 382/128 |
| 7,848,560 B2 * | 12/2010 | Wang et al. | 382/132 |
| 7,876,874 B2 * | 1/2011 | Goto et al. | 378/5 |

(Continued)

FOREIGN PATENT DOCUMENTS
EP 1 657 680 A1 5/2006

(Continued)

OTHER PUBLICATIONS
Frosio et al., "Enhancing Digital Cephalic Radiography with mixture models and local gamma correction", Jan. 2006, pp. 113-121, IEEE Medical Imaging, vol. 25(1), DOI: 10.1109/TMI.2005.861017.

(Continued)

*Primary Examiner* — Allen C. Ho

(57) ABSTRACT

Modern image processing systems for the postprocessing of X-ray images require a large number of input parameters and take a great deal of time. So that calculations do not need to be made sequentially for different sets of input parameters, parallel processors are used, in which the same image processing program is executed in each case, but with different input parameters in each case. A large number of processed X-ray images is thus obtained, which in particular can also be displayed simultaneously. From the multiple processed x-ray images, a repeated postprocessing of a processed x-ray image can take place by mixing.

13 Claims, 4 Drawing Sheets

U.S. PATENT DOCUMENTS

2006/0133694 A1    6/2006    Dewaele

FOREIGN PATENT DOCUMENTS

WO    WO 2006/038165 A1    4/2006
WO    WO 2006/072062 A2    7/2006

OTHER PUBLICATIONS

Egmont-Petersen et al., "Image processing with neural networks—a review", Institute of Information and Computing Sciences, Utrecht University, Utrecht, Netherlands, Received May 12, 2001, pp. 2279-2301, Pattern Recognition, www.elsevier.com/locate/patcog.

Josien P. W. Pluim, J. B. Antoine Maintz, Max A. Viergever; "Mutual-information-based registration of medical images: a survey"; Aug. 2003; pp. 986-1004; IEEE Transactions on Medical Imaging; vol. 22, No. 8.

Alina N. Moga; "Parallel Multiresolution Image Segmentation with Watershed Transformation"; Moga; Lecture Notes in Computer Science; 1999; pp. 226-235; vol. 1557; Proceedings of the 4th International ACPC Conference Including Special Tracks on Parallel Numerics and Parallel Computing in Image Processing, Video Processing, and Multimedia: Parallel Computation table of contents. 3-540-65641-3.

Herve Lombaert, Yiyong Sun, Leo Grady und Chenyang Xu; "A Multilevel Banded Graph Cuts Method for Fast Image Segmentation"; Proceedings of the Tenth IEEE International Conference on Computer Vision; 2005; vol. 1; pp. 259-265.

* cited by examiner

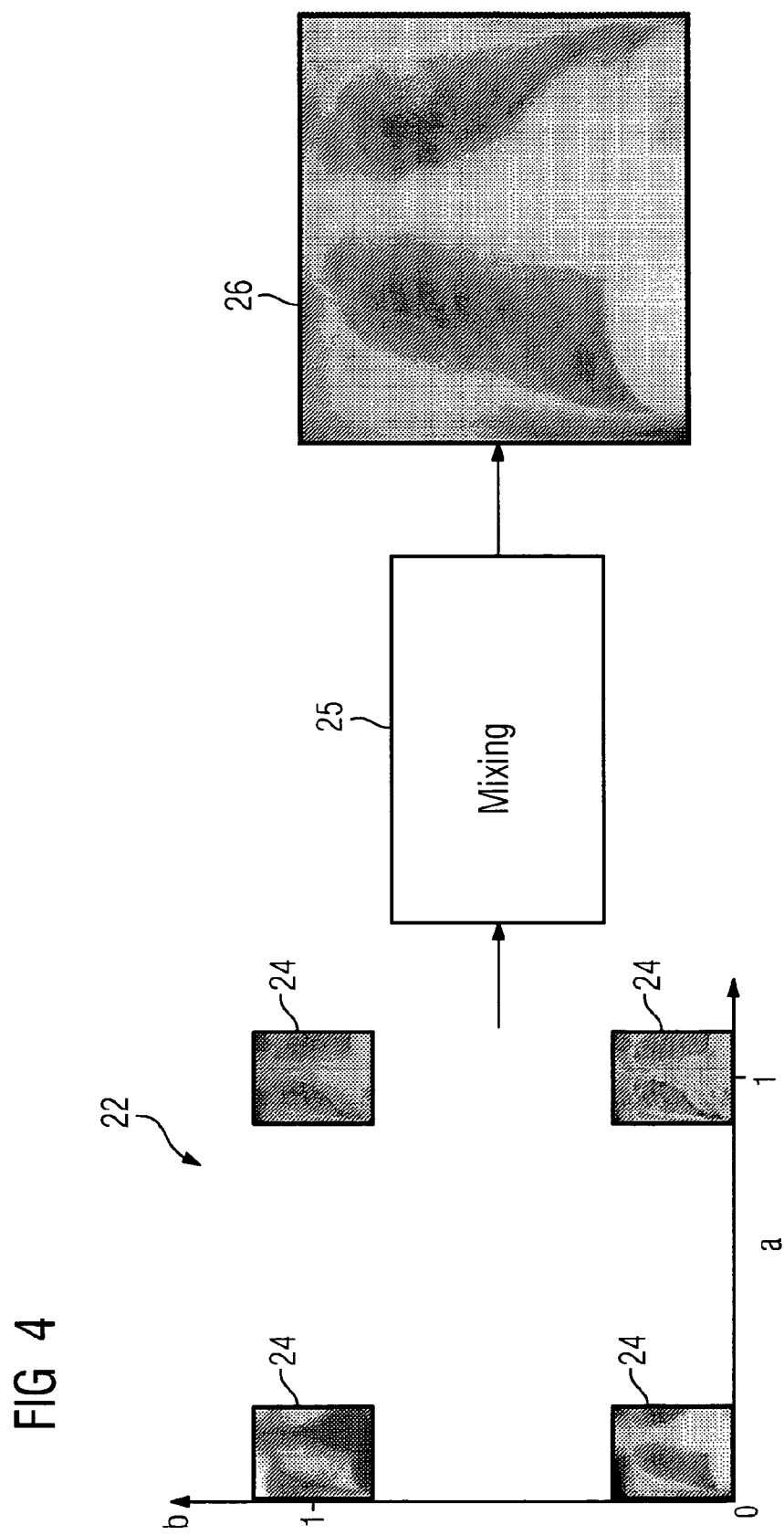

METHOD FOR PROVIDING VARIOUSLY PROCESSED IMAGE DATA AND X-RAY IMAGE SYSTEM

CROSS REFERENCE TO RELATED APPLICATIONS

This application is the US National Stage of International Application No. PCT/EP2007/059939, filed Sep. 20, 2007 and claims the benefit thereof. The International Application claims the benefits of German application No. 10 2006 044 189.3 filed Sep. 20, 2006, both of the applications are incorporated by reference herein in their entirety.

FIELD OF THE INVENTION

The invention relates to a method for providing variously processed image data. It also relates to a method for processing varied image data. Finally it also relates to an X-ray image system that allows the methods to be executed in each case.

BACKGROUND OF THE INVENTION

X-ray images are conventionally provided in the form of 2D pixel data. It is common practice to subject these X-ray images to image processing in order to be able to better emphasize some structures in the image. Image processing programs are becoming increasingly more complex and have a high number of input parameters. It is not always possible to define ideal input parameters at the start. The fact that the image processing program typically requires a relatively large amount of time is disruptive as the program then has to be carried out again with modified input parameters. The situation may also occur where a user wants to have different structures emphasized in an X-ray image and this is only possible by way of mutually independent image processing with respectively independent input parameters. In other words, a plurality of processed X-ray images is produced. Even in this connection previous X-ray imaging systems have the drawback that they can only carry out one case of image processing at the same time respectively, so the overall time until the desired variously processed image data are available is increased.

Printed publication WO 2006/072062 A describes a computer system and signal processors which make it possible to calculate image data more quickly. Using decision algorithms the processors are optimally configured as a function of the desired image processing function in this connection.

If variously processed image data are available then these have previously been treated independently of each other. A user who finds that a certain structure is particularly well emphasized in a first processed X-ray image and another structure is emphasized in a second processed X-ray image, does not have the option of combining these varied image data in the prior art.

Printed publication EP-A-1 657 680 describes a system for displaying X-ray images in which images which show a patient in different postures can be superimposed on each other. The body parts, whose position is unchanged in the various postures, are aligned with each other, so the superimposed images give an impression of how the moved body parts have shifted.

SUMMARY OF THE INVENTION

It is therefore the object of the invention to provide a user with the possibility of having variously processed image data available as quickly as possible and of being able to use these data as optimally as possible.

According to one aspect of the invention a method for providing variously processed image data and an X-ray image system according to the claims are provided.

According to a further aspect of the invention a method for processing varied image data and an X-ray image system according to the claims are provided.

The method according to the invention for providing variously processed image data relating to an X-ray image that has been taken which exists as a 2D pixel data record, comprises the following steps:

providing at least two parallel processors which are each configured for executing one and preferably the same image processing program that processes a 2D pixel data record as a function of at least one input parameter to produce a processed X-ray image from an X-ray image, defining all input parameters for the (respective) image processing program for each parallel processor, wherein the input parameter(s) for a parallel processor differ(s) at least in one entry, i.e. a value for one (of the) input parameter(s) differs from the input parameter or the input parameters for another parallel processor in each case, simultaneously running the (respective) image processing program in all parallel processors with the defined input parameters, and storing the processed 2D pixel data record relating to each parallel processor in a file.

The invention therefore uses parallel processors to simultaneously provide variously processed image data. This dispenses with cumbersome experimental adjustment of the input parameters ("trial-and-error method"). Instead a respective processed X-ray image is produced for different sets of input parameter. The parallel processors work particularly time-efficiently in this connection.

Preferably all processed 2D pixel data records are displayed simultaneously, so the processed X-ray images are displayed simultaneously. A user can therefore determine by direct comparison the effect of the difference in the image processing programs or the input parameters for the single image processing program and, by way of example, select a processed X-ray image that can be used particularly efficiently.

The processed 2D pixel data records can be displayed on separate screens or even on different sections of one screen ("split-screen").

In a preferred embodiment the provision of variously processed image data is continued in that a mixed 2D pixel data record is produced from all processed 2D pixel data records with a predefined weighting. This should be taken to mean that for each pixel the data value of the first, second, etc. processed X-ray image in each case is added, with a predefined weighting, and that the added values relating to the same pixel are used as the data value for the mixed 2D pixel data record.

The mixed 2D pixel data record, in particular if it is displayed, allows the user to benefit from use of the different input parameters within a single X-ray image, whereby optionally completely different structures are emphasized simultaneously in the mixed 2D pixel data record, or, more precisely, in its display. As the weighting is significant this preferably takes place interactively in that it is possible for a user to select a point in a 1-, 2- or 3-dimensional (or even higher-dimensional) coordinate system. The user is preferably provided with a display of the X-ray images for weighting at the same time as the coordinate system, so he is given help with his input.

The X-ray image system according to the invention comprises a unit for taking an X-ray image in the form of a 2D pixel data record and a data processing unit for processing the 2D pixel data record. It is characterized in that the data processing unit has at least two parallel processors which are each configured for executing one and preferably the same image processing program that produces a processed 2D pixel data record from a 2D pixel data record as a function of at least one input parameter. The X-ray image system according to the invention allows the method according to the invention, which is particularly time-efficient, to be carried out.

According to a further aspect of the invention a method for processing varied image data, which is in the form of at least two 2D pixel data records, is provided which comprises the following steps:

displaying a (one- or multi-dimensional) coordinate system in which a point can be selected by a user, and producing a 2D pixel data record by adding the data entries of all 2D pixel data records to each pixel with a weighting defined by the coordinate values of the point.

The method according to this aspect of the invention allows a user, to whom varied image data is available, preferably as a result of the method according to the first aspect of the invention, to optimally use these data by using a weighting of the 2D pixel data record to produce a new 2D pixel data record. The user selects the point for example by way of an input unit, such as a computer mouse. It is also possible for the user, in particular when the produced 2D pixel data record is also displayed, to be able to directly determine whether the selected point was selected sufficiently well and can optionally make a correction by shifting the point.

An example of a weighting is given with reference to the provision of two 2D pixel data records: these should have the data values $d_1(x,y)$ and $d_2(x,y)$ for all coordinate values x,y (i.e. for all pixels). The user selects a value from a one-dimensional coordinate system which ranges from a value 0 to the value 1. In other words, he selects a value a in the interval [0; 1]. The mixed 2D pixel data record, which has the data values $d_{mix}(x,y)$, is then formed according to the calculation rule:

$$d_{mix}(x,y)=a \times d_1(x,y)+(1-a) \times d_2(x,y).$$

When using four 2D pixel data records with the data $d_1(x, y)$, $d_2(x,y)$, $d_3(x,y)$ and $d_4(x,y)$ for all coordinate values x,y the user must select a point in a two-dimensional coordinate system, which starts at point (0, 0) and in each coordinate extends up to point 1 respectively, in other words ends diagonally in point (1, 1). This means nothing other than that the user can select a value a in the interval [0; 1] and a value b in the interval [0; 1] and the mixed 2D pixel data record with data values $d_{mix}(x,y)$ is produced according to the calculation rule:

$$d_{mix}(x, y) = a \times b \times d_1(x, y) + (1-a) \times b \times d_2(x, y) + a \times (1-b) \times d_3(x, y) + (1-a) \times (1-b) \times d_4(x, y).$$

According to this aspect of the invention the X-ray system is characterized in that the data processing unit is configured for receiving the coordinate values relating to a point in a coordinate system and is also configured for producing a mixed 2D pixel data record from at least two different 2D pixel data records according to weighting determined by the coordinate values.

This point is preferably interactively selected, for which purpose the data processing unit should be configured for displaying a coordinate system in which the point, which has the coordinate values that determine the weighting, can be selected by a user by means of an input unit.

The X-ray images which are to be mixed with the weighting should preferably be displayed in, on, or next to, the coordinate system, i.e. somehow with respect to the coordinate system. In other words, the 2D pixel data records that are to be processed with respect to the mixed 2D pixel data record should be displayed with respect to the coordinate system.

BRIEF DESCRIPTION OF THE DRAWINGS

Preferred embodiments of the invention will be described hereinafter with reference to the drawings, in which.

DETAILED DESCRIPTION OF THE INVENTION

Figure 1:
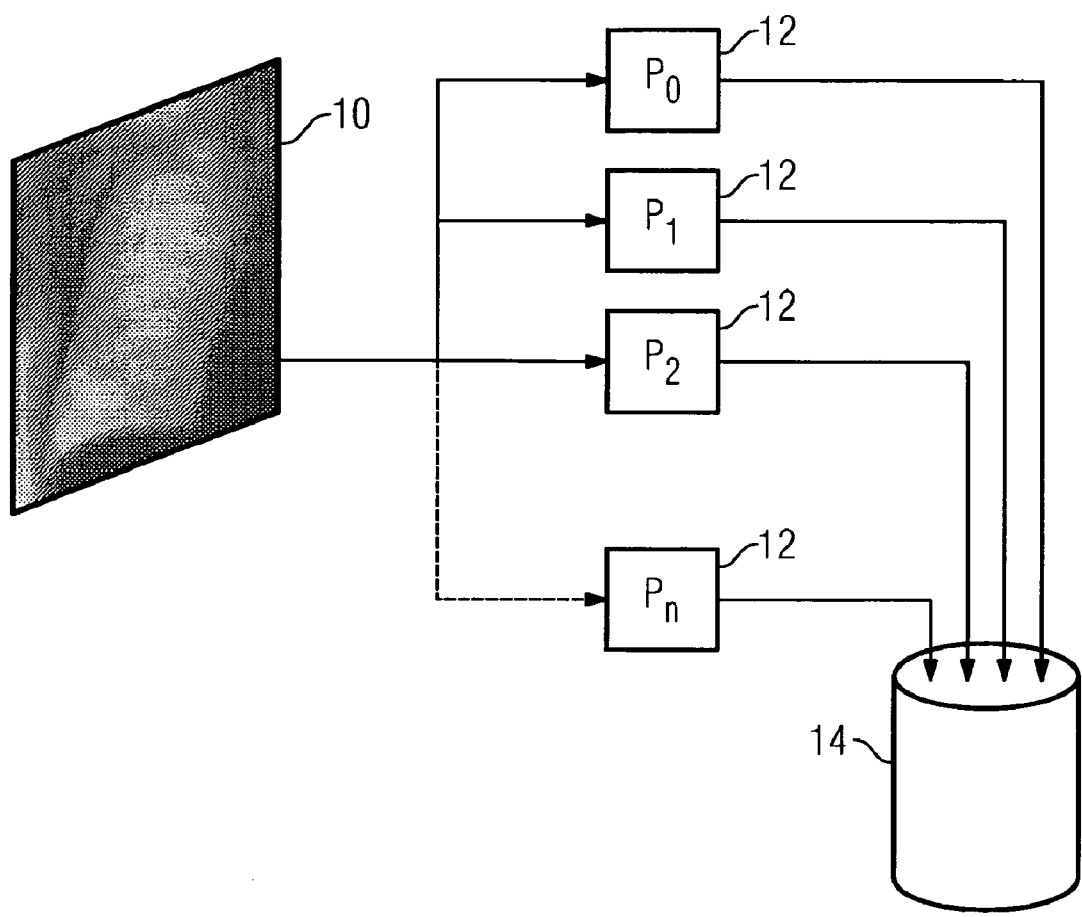
FIG. 1 serves to schematically illustrate the method according to the invention, FIGS. 2 and 3 each schematically serve to illustrate developments of the method according to the invention, and FIG. 4 schematically illustrates the development of the inventive method according to a further aspect of the invention.

The starting point of the invention is that an X-ray imaging system has taken an X-ray image 10 in a manner that is conventional per se. The X-ray image, which is displayed in FIG. 1, is in the form of a 2D pixel data record, as is produced for example by a solid state detector, on which X-rays from an X-ray source impinge.

It is accordingly a matter of processing this X-ray image 10 as variously as possible. For this purpose a plurality of parallel processors 12 is provided which are identified in FIG. 1 by $P_0$ to $P_n$. The short dashes of the arrow leading from the X-ray image 10 to the processor $P_n$ symbolizes that the number n can be random.

The parallel processors 12 are configured for carrying out an image processing program which is identical for all processors. Irrespective of this, this identical image processing program can be programmed into each processor 12 independently of the other processors. It is also possible for the parallel processors 12 to access a common program code which is stored in one of the parallel processors 12 or in a main processor (not shown) that is independent thereof. The present case involves an image processing program which carries out image processing as a function of at least one input parameter. These can be very simple image processing methods, such as edge enhancement or harmonization for example, in which the parameters "core size" or "enhancement" are used. The invention is particularly expedient in the case of complex image processing programs as well, for example in what are known as multi-scale methods. The input parameters should be different for each of the parallel processors 12. In the case where there are four parallel processors (PP), four processed X-ray images are produced. The following parameters apply by way of example for the multi-scale method so the sets of parameters differ for the four processors:

| | PP 1 | PP 2 | PP 3 | PP 4 |
|---|---|---|---|---|
| Enhancement of frequency band with highest spatial frequencies | 1.0 | 3.0 | 2.5 | 1.3 |
| Enhancement of frequency band 2 | 1.8 | 2.0 | 2.0 | 2.5 |

-continued

|  | PP 1 | PP 2 | PP 3 | PP 4 |
|---|---|---|---|---|
| Enhancement of frequency band 3 | 1.0 | 1.5 | 1.0 | 1.0 |
| Enhancement of frequency band 4 | 1.0 | 1.0 | 1.0 | 0.8 |
| Enhancement of frequency band with lowest spatial frequencies | 1.0 | 1.0 | 0.4 | 0.5 |
| Gamma value for look-up table (gradation) | 0.2 | 0.5 | 0.6 | 0.8 |

As is generally known, an X-ray image is divided into a plurality of frequency bands (based on the spatial frequencies) in the context of the multi-scale method, and an enhancement factor is defined as a function of frequency. The image is then pieced together again to form a processed X-ray image.

Now back to FIG. 1: Owing to the different input parameters each parallel processor 12 has therefore produced a different processed X-ray image, i.e. a processed 2D pixel data record, and this processed 2D pixel data record is stored in a memory 14.

The invention is already efficient in this embodiment as time is gained as a result of parallel processing. The files are then available to the user in the memory 14.

Figure 2:
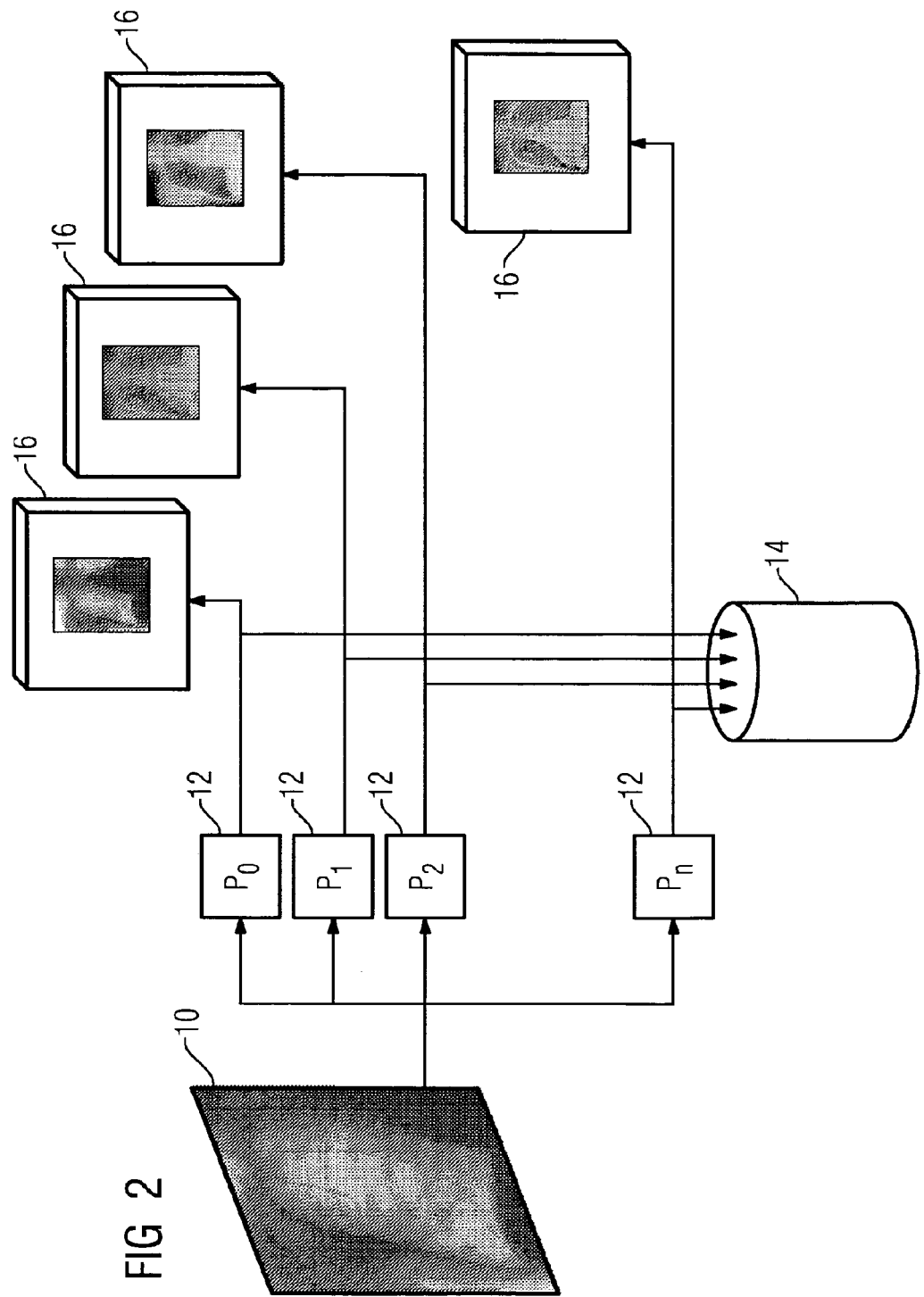

In a first development of the invention the X-ray images processed by each of the parallel processors 12 are each displayed on a separate screen, see screens 16 in FIG. 2. Particularly high quality displays of the processed X-ray images are therefore available to the user, it being possible for him to see the various processed X-ray images simultaneously on the screens 16 and it therefore being possible for him to check the effect of the different input parameters.

Figure 3:
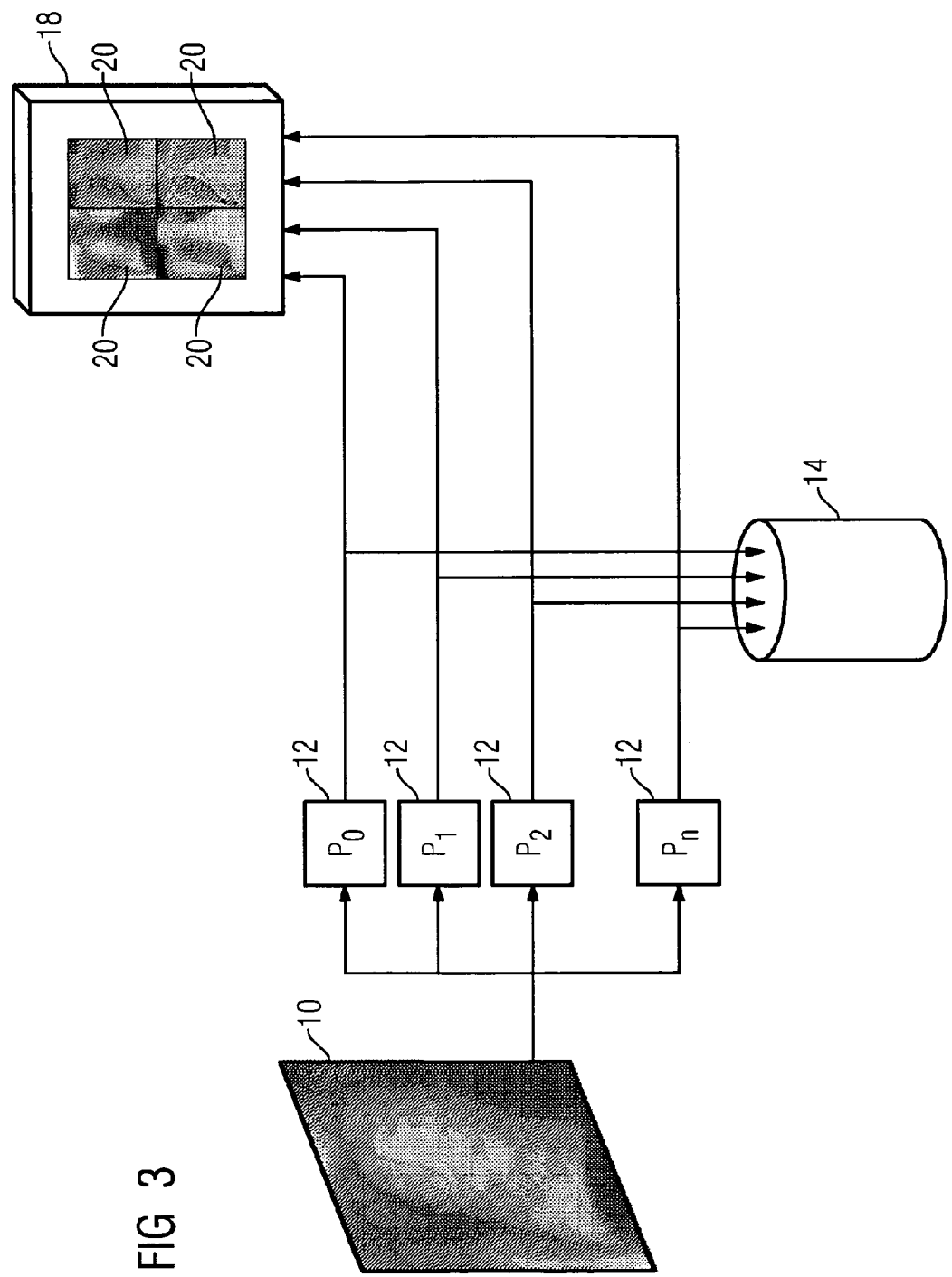

In a modified embodiment of this development the processed X-ray images are displayed in different sections 20 of a single screen 18, cf. FIG. 3. The information is therefore available to the user in a particularly compact manner, in particular making it easier to compare the processed X-ray images with each other.

Under some circumstances it is desirable to link the advantages of one set of input parameters, which is reflected in a first processed X-ray image, with those of a second set of input parameters, which is reflected in a second processed X-ray image. A preferred development of the invention provides the possibility of mixing the processed X-ray images. A user is provided with a display on a screen, as is shown on the left of FIG. 4 and identified by 22. Shown is a coordinate system which starts at the origin and ends at point 1 with respect to each coordinate. The first coordinate is designated a here, and the second coordinate b. The corners of the coordinate system show the four processed X-ray images 24 individually. A user can accordingly interactively select a point in the coordinate system, for example by moving a cursor using a computer mouse, wherein a should be selected between 1 and 0 respectively and b should be selected between 1 and 0 respectively. The X-ray images 24 are shown such that in the subsequent mixing step they are weighted all the more strongly the closer the point selected in the coordinate system 22 by means of the computer mouse is on the image presentation. Calculation of a new processed X-ray image then takes place in a "mixing" step (reference numeral 25) from the four previous X-ray images 24 and, more precisely, using the following formula: the 2D pixel data record corresponding to the processed X-ray images 24 has the data values $d_1(x,y)$, $d_2(x,y)$, $d_3(x,y)$ and $d_4(x,y)$ with respect to pixel coordinates x,y. The user accordingly selects a value for the coordinates a in the interval [0; 1] and a value for the coordinates b in the interval [0; 1]. This produces a new 2D pixel data record with data values $d_{mix}(x,y)$ with respect to coordinates x,y from formula:

$$d_{mix}(x, y) = a \times b \times d_1(x, y) + (1-a) \times b \times d_2(x, y) + a \times (1-b) \times d_3(x, y) + (1-a) \times (1-b) \times d_4(x, y).$$

The pixel data record processed in this way with the data values $d_{mix}(x,y)$ is accordingly also displayed and this is shown in FIG. 4 as processed X-ray image 26. It is provided that the step of selecting a point from the coordinate system 22 can be repeated as often as desired by moving the mouse. If the user is not satisfied with the processed X-ray image 26 he can move the previously selected point closer to one of the X-ray images 24 (and further away from the remainder of the X-ray images 24) and thus increase the weighting thereof. Finally the user makes a permanent selection by clicking on a point with the mouse, and the processed X-ray image is stored.

The mixing, described with reference to FIG. 4, of a plurality of X-ray images can also be achieved independently of the prior provision of X-ray images 24 as a result of parallel processing. The sole requirement is that the X-ray images 24 are "mixable" in some way, wherein they are preferably the result of processing of a single original X-ray image.

The invention claimed is:

1. A method for providing variously processed image data of a 2D pixel data record of an X-ray image, comprising:
    providing a plurality of parallel processors each for processing the 2D pixel data record as a function of an input parameter of an image processing program;
    defining a plurality of input parameters of the image processing program for the parallel processors, the plurality of input parameters being different from each other for each of the plurality of parallel processors;
    simultaneously executing the image processing program in the plurality of parallel processors with the defined input parameters for producing processed 2D pixel data records; and
    storing the processed 2D pixel data records from the plurality of parallel processors in a file;
    calculating a mixed 2D pixel data record is calculated from the processed 2D pixel data records each with a pre-defined weighting; and
    selecting a point in a coordinate system by a user to define the weighting.

2. The method as claimed in claim 1, furthering comprising simultaneously displaying the processed 2D pixel data records.

3. The method as claimed in claim 2, wherein the processed 2D pixel data records are displayed simultaneously on separate screens.

4. The method as claimed in claim 2, wherein the processed 2D pixel data records are displayed simultaneously on different sections of a screen.

5. The method as claimed in claim 1, further comprising displaying the mixed 2D pixel data record.

6. The method as claimed in claim 1, wherein values of the plurality of input parameters are different for each of the plurality of parallel processors.

7. The method as claimed in claim 1, wherein a different input parameter is defined for each of the plurality of parallel processors.

8. A method for processing image data from a plurality of 2D pixel data records, comprising:
displaying a coordinate system;
selecting a point in the coordinate system;
defining a weighting by a coordinate value of the point for each of the plurality of 2D pixel data records; and
producing a mixed 2D pixel data record by adding the plurality of 2D pixel data records to each pixel with the weighting given to each of the plurality of 2D pixel data records,
wherein the mixed 2D pixel data record is calculated according to a rule:

$$d_{mix}(x,y)=a \times d_1(x,y)+(1-a)\times d_2(x,y),$$

wherein:
$d_{mix}(x,y)$ is a value of the mixed 2D pixel data record for a coordinate value of a point x,y,
$d_1(x,y)$ is a value of a first 2D pixel data record for the coordinate value of the point x,y,
$d_2(x,y)$ is a value of a second 2D pixel data record for the coordinate value of the point x,y, and
a is a value selected in an interval [0; 1].

9. The method as claimed in claim 8, wherein the mixed 2D pixel data record is further calculated according to a rule:

$$d_{mix}(x, y) = a \times b \times d_1(x, y) + (1 - a) \times b \times d_2(x, y) + a \times (1 - b) \times d_3(x, y) + (1 - a) \times (1 - b) \times d_4(x, y),$$

wherein:
$d_3(x,y)$ is a value of a third 2D pixel data record for the coordinate value of the point x,y,
$d_4(x,y)$ is a value of a fourth 2D pixel data record for the coordinate value of the point x,y,
and
b is a value selected in an interval [0; 1].

10. An X-ray image system, comprising:
a recording unit that records a 2D pixel data record of an X-ray image; and
a data processing unit comprising a plurality of parallel processors that each processes the 2D pixel data record as a function of an input parameter of an image processing program,
wherein a plurality of 2D pixel data records are recorded, and
wherein the data processing unit:
receives a coordinate value of a point in a coordinate system,
defines a weighting by the coordinate value of the point for each of the plurality of 2D pixel data records, and
produces a mixed 2D pixel data record from the 2D pixel data records according to the weighting given to each of the plurality of 2D pixel data records.

11. The X-ray image system as claimed in claim 10, further comprising display unit that displays the coordinate system.

12. The X-ray image system as claimed in claim 11, the 2D pixel data records are displayed on the display unit with respect to the coordinate system.

13. The X-ray image system as claimed in claim 10, further comprising a user interface that is configured to allow a user to select the point.

* * * * *